Aug. 25, 1959  D. A. EPP  2,901,211
VALVE MEANS FOR IRRIGATION PIPES
Filed Oct. 16, 1957
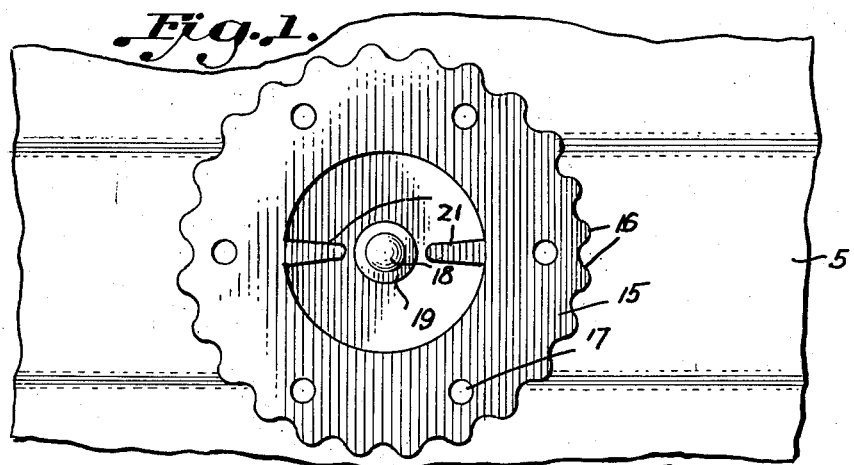
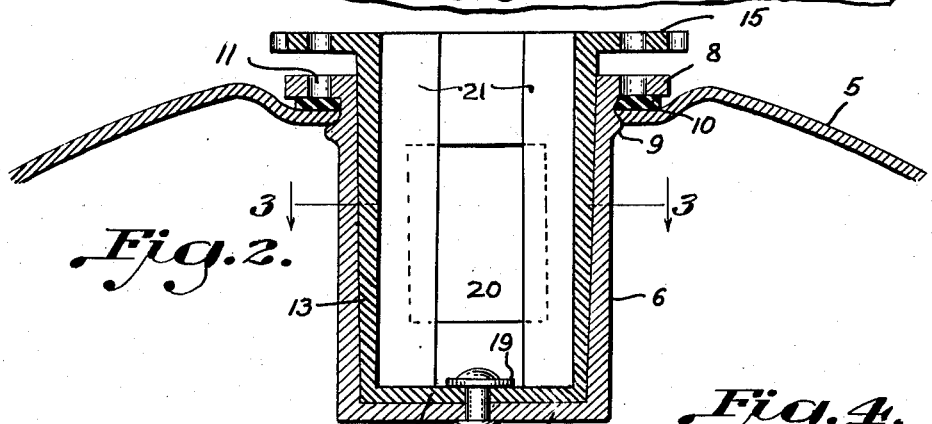
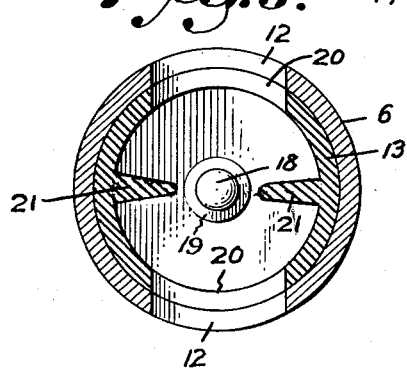
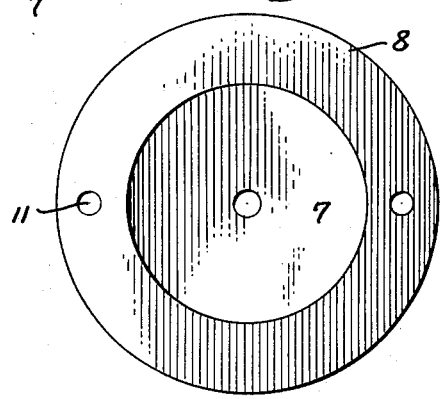
INVENTOR.
DAVID A. EPP,
BY
ATTY.

United States Patent Office 2,901,211
Patented Aug. 25, 1959

2,901,211

VALVE MEANS FOR IRRIGATION PIPES

David A. Epp, Henderson, Nebr.

Application October 16, 1957, Serial No. 690,485

2 Claims. (Cl. 251—145)

This invention pertains to means to control the flow of water from irrigation pipes of the above ground type.

The primary object of the invention is to provide a structure for association with the usual thin walled above ground irrigation pipes wherein the outlet opening within the pipe may be opened to its fullest extent, closed partly, or sealed securely against any flow whatever as occasion demands.

A further object of the invention is to provide a valve structure of such character that it may be quickly and easily inserted within standard irrigation pipes by simple means, and which operates in such manner as to accurately govern the flow of water from within the pipe or to seal it off securely and against leakage when desired.

A still further object of the invention is to provide a valve structure for application to standard irrigation pipes which is of extremely simple construction, which comprises but few simple and readily assembled parts, which parts may be constructed by simple operations and with a minimum of material so as to enable them to be marketed at a minimum cost and yet which will prove highly effective in carrying out the other objects of the invention.

A still further and particular object is to provide valve structure for application to above ground irrigation pipes which has its parts so constructed and assembled as to minimize the opportunity for wear, breakage or derangement and which may be easily applied to or removed from the pipe by simple processes and without the exercise of special knowledge or the requirement of special tools.

A still further object of the invention is to provide means in connection with the valve structure to insure a steady, uniform flow of liquid from the interior of the pipe when the valve is either partially or fully opened and free from any spray or whirling effect.

With the foregoing objects in view, together with others which will appear as the description proceeds, the invention resides in the novel construction, combination and arrangement of parts, all as will be described more fully hereinafter, illustrated in the drawing, and particularly pointed out in the claims.

In the drawing:

Fig. 1 is a fragmentary top plan view of a standard irrigation pipe showing the application thereto of a valve structure involving the invention, Fig. 2 is a fragmentary cross sectional view through a part of the irrigation pipe and illustrating, in section, the application of a valve structure embodying the invention, Fig. 3 is a transverse sectional view taken substantially upon the line 3—3 of Fig. 2 and looking in the direction by the arrows, and Fig. 4 is a top plan view of the outer shell forming a part of the invention.

Referring now more particularly to the drawing, the thin walled irrigation pipe of the desired diameter is indicated at 5 and will have a suitable opening of circular formation cut in a desired part thereof where the pipe is to be tapped.

The valve structure embodying the invention includes an outer cylindrical shell 6 closed at its bottom as at 7 and being opened at its upper end; the said end being provided with an outwardly directed flange indicated at 8. The exterior surface of this shell adjacent to the upper end thereof is provided with a screw thread 9. The transverse diameter of this shell is substantially equal to the diameter of the opening cut in the irrigation pipe 5, and the threads 9 engage with the edges of the pipe opening so that the shell 6 may be screwed tightly within the pipe, a gasket 10 being interposed between the flange 8 and the adjacent surface of the pipe 5 to bring about a leakproof joint of the outer shell with the pipe. The flange 8 may be provided with spaced openings 11 for the application of a suitable tool to enable the shell to be rotated to bring about the sealing action or to be rotated in a reverse direction to withdraw the valve structure should occasion demand. The side walls of the shell 6 are provided with diametrically opposed openings or ports 12.

Arranged so as to snugly fit within the outer shell 6 is an inner shell 13, closed by a bottom 14 at its lower end and open at its top as shown; the top being provided with an outwardly directed flange 15 having roughened or knurled edges 16 to enable the same to be rotated easily by hand. This flange may also be provided with openings 17 through which a suitable tool may be inserted to rotate either the inner shell or both the inner and outer shells as occasion demands. It will be observed that the inner walls of the outer shell 6 are inclined inwardly in a downward direction while the outer walls of the inner shell are similarly inclined so as to bring about a tight fit between these surfaces and thus prevent leakage. The bottom of the inner shell receives an axial rivet or bearing 18 to hold the inner and outer shells together and to permit the inner shell to rotate with respect to the outer shell. A washer 19 surrounds the rivet and insures a tight yet sliding fit between these members. The inner shell is also provided with openings or ports 20 in its opposite side walls, which ports are of substantially the same dimension as the corresponding ports or openings of the outer shell so that when these ports are in register with one another water may flow to the interior of the inner shell and outwardly through the open top thereof when irrigation is desired. Rotation of the inner shell with respect to the fixed outer shell will more or less move these ports out of register so that the flow may be accurately governed. When the inner shell has been rotated at substantially 90 degrees to the position shown in Fig. 3, the ports will be entirely closed so that the valve will be sealed against any flow whatever.

Arranged within the inner shell and at substantially 90 degrees from the centers of the openings 20 and coextensive with the shell are a pair of fins or baffles 21 one projecting from each side of the shell and in diametrically opposite relationship. These baffles extend in a radial direction toward the longitudinal center of the shell but have their ends terminating inwardly from said center in order not to impede the flow. With the baffles or fins arranged in this manner, any tendency of whirling of the flow is prevented, whereby the water passes from the valve in a steady unbroken stream with no rotary movement when the valve is either partially or fully open.

From the foregoing, it is apparent that the valve structure described will perform efficiently in the accomplishment of the purposes desired. The parts are constructed preferably of metal, either extruded or molded, and the shells interfit with one another in such manner, by reason of the inclined coacting walls, to permit free rotation of the sleeves with respect to one another and yet will maintain their sealing engagement with each other. The structure is such that the assembled valve may be easily and quickly applied to the pipe opening without the use of special skill or tools and in such manner as to maintain the outer shell in tight engagement with the pipe without danger of leakage. It is preferred that the washer 19 which surrounds the upper end of the pivot 18 be of spring type so as to maintain downward pressure upon the inner shell in order to maintain tight frictional contact between the bottom and side walls of the inner shell with the corresponding bottom and side walls of the outer shell.

I claim:

1. Means for controlling the flow through a circular opening formed in the wall of a pipe comprising; an outer shell of cylindrical shape corresponding in diameter to the opening in said pipe and inserted therein, said outer shell being open at its top and closed at its bottom and having an outwardly directed flange surrounding its open end, a thread on the exterior surface of the side wall of said shell below said flange for engagement with the edges of said opening, said outer shell having a port in its side wall, a gasket interposed between said flange and said pipe, an inner shell of slightly greater length than said outer shell closed at its bottom and open at its top rotatably mounted in said outer shell and having its bottom and side walls closely fitting with the bottom and side walls of said outer shell, said inner shell having a port in its side wall to register with the port of said outer shell, a pivot secured to and extending inwardly of the bottom of said outer shell and centrally thereof, said pivot extending through the bottom of said inner shell, a washer surrounding said pivot and forcing the bottom of said inner shell in tight engagement with the bottom of said outer shell, a flange extending outwardly from the upper end of said inner shell overlying the flange of said outer shell, and said flanges having openings therein in register with one another to receive a shell rotating tool.

2. A valve structure comprising an outer cylindrical shell having openings in its side wall closed at its bottom and open at its top, a flange projecting outwardly from the open end of said shell, a thread on the exterior of said shell below said flange, an inner shell arranged within said outer shell and corresponding in shape and size with the interior of the latter having a closed bottom and of a length greater than said outer shell to project at its open end beyond the corresponding end of said outer shell, a flange projecting outwardly from the projecting end of said inner shell overlying and spaced from the flange of said outer shell, said inner shell having openings in its side wall corresponding to the openings in the wall of said outer shell, pivot means connecting the bottoms of said shells to permit rotation of said shells with respect to one another, and said shell flanges having registering openings therein to receive a tool for rotating said shells.

References Cited in the file of this patent
UNITED STATES PATENTS

| | | |
|---|---|---|
| 305,638 | Spruce | Sept. 23, 1884 |
| 1,004,032 | Ivor | Sept. 26, 1911 |
| 1,096,385 | Mueller | May 12, 1914 |
| 1,123,817 | Tarrant | Jan. 5, 1915 |
| 1,296,239 | Van Meter | Mar. 4, 1919 |
| 1,371,721 | Bayles | Mar. 15, 1921 |
| 1,737,959 | Congable | Dec. 3, 1929 |
| 2,229,600 | Park | Jan. 21, 1941 |
| 2,766,005 | Fischer | Oct. 9, 1956 |